Jan. 29, 1935.   F. P. SCHAFFER   1,989,467
METHOD OF PRODUCING RUBBER SOLED SHOES
Filed March 9, 1934
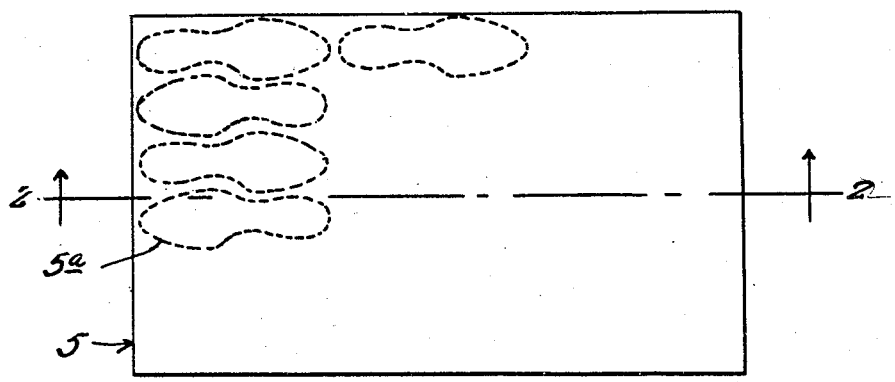
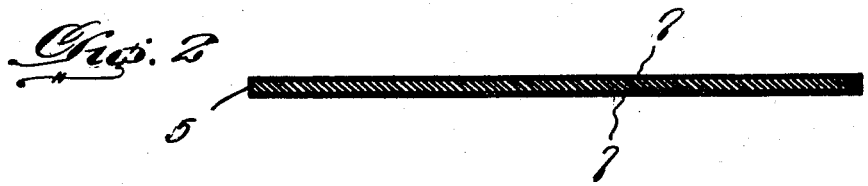
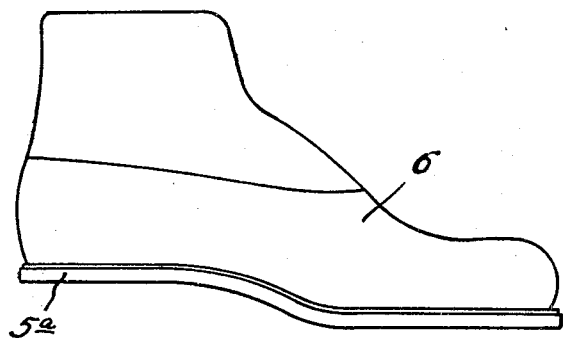
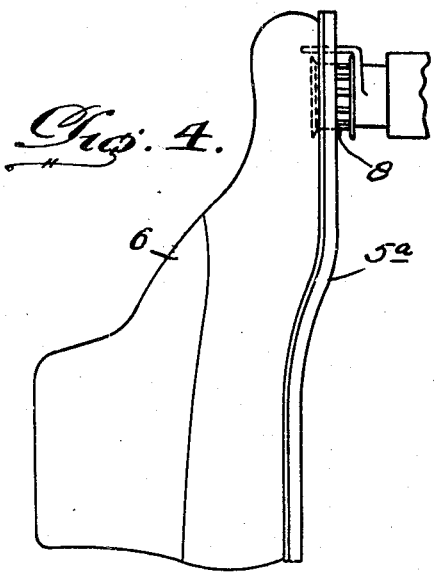
Inventor
Francis P. Schaffer,
By J. Stanley Burch
Attorney Patented Jan. 29, 1935

1,989,467

UNITED STATES PATENT OFFICE 1,989,467

METHOD OF PRODUCING RUBBER SOLED SHOES

Francis Peter Schaffer, Belmont, Mass.

Application March 9, 1934, Serial No. 714,864

3 Claims. (Cl. 12—142)

Under the present day method of producing rubber-soled shoes, the plain or unfinished soles are suitably made and attached to the uppers, after which the soles are washed, then painted, then rolled and waxed, and then polished before packing. The paints used consist chiefly of pigments with water-soluble varnishes, glues or emulsions for binders, and as they will crack and chip, the soles must be beaten out and stitched to the uppers before they are coated with these present day paints. Such present day paints are also such that they will readily absorb dirt and the dressing and cement used in shoe manufacture, thereby making it impractical to coat the soles with these paints until the shoes are entirely built and ready for finishing. If the soles were coated with these paints prior to building the shoes, the paint on the soles would absorb the dirt and the dressing and cement encountered and used in the shoe-building process, and an attempt to remove these foreign substances would also result in removal of the paint, so that buffing or washing off the old paint and refinishing of the soles would be necessary. Further, as present day paints for use in finishing rubber soles are essentially what may be termed water paints, they are not waterproof and will not dry quickly. For this reason considerable delay occurs in the manufacture of rubber-soled shoes under present day methods, due to the time necessary to effect drying of the rubber soles or bottoms after they are painted. This delay is extremely costly in damp weather, and has only been overcome by the use of drying rooms built at a tremendous cost and operated at a great expense. Further, the necessity of painting the soles or bottoms after they are attached to the uppers invariably results in getting the paint on the uppers and on the edges of the soles or bottoms, which must be removed at an additional expense. Similarly, painting of the soles or bottoms after they are stitched to the upper results in paint coating the stitches, thereby marring the appearance of the shoes in that they do not have the stitches showing in the original color of the thread as in leather soles. The removing of the paint from the thread or stitches is costly, and few manufacturers attempt it. Still further, in the building of the shoes, the soles or bottoms become more or less wavy and have what are known as "high spots", so that when the soles or bottoms are rolled and polished after attachment to the uppers, these high spots show what are known as "burnt" marks where the operator either presses the shoe too hard against the wheel or holds the shoe against the polishing brush too long. This naturally results in a non-uniform and more or less unsightly finished shoe. In producing rubber bottomed shoes in accordance with the present invention, the rubber bottoms or soles are coated with a non-absorbent or hard drying enamel which dries quickly and which is water-proof and flexible after drying, such enamel coating being provided on the bottoms or soles before attachment of the same to the uppers. Due to the nature of this enamel, it will withstand the beating out operation and the operation of stitching the bottoms or soles to the uppers, without cracking and chipping. The bottoms or soles may be coated with this enamel before or after they are cut from a slab of the desired material, and after the bottoms or soles are attached to the uppers, the shoes are finished and require no final finishing operation. The enamel leaves a hard smooth luster surface which absorbs no foreign substance, and dirt or the cement and dressing used in building the shoes will only adhere lightly and can be readily removed with a damp cloth without harm to the enamel or effect upon its luster. The present invention renders a bottom finishing department unnecessary so that the finishing machinery may be discarded and so that the space occupied by such machinery can be utilized for ordinary shoe building machinery to obtain increased production. Due to the quick-drying nature of the enamel, delays necessitated by waiting for the painted soles or bottoms to dry are avoided, and drying apparatus is made unnecessary. The latter obviously eliminates the expense of providing and maintaining drying apparatus and makes additional space available for increased production. It will be further seen that by enameling the bottoms or soles before they are attached to the uppers, the enamel cannot get on the uppers, and any enamel that might get on the edges of the bottoms or soles will be removed when such edges are trimmed. This obviously eliminates the necessity of cleaning the uppers and the edges of the soles and then refinishing the soles after they are attached to the uppers. In addition, as the bottoms or soles are coated before being stitched to the uppers, the thread or stitches show in their original color so that the soles give as close an appearance to a leather sole as is possible. When the edges of the black or dark bottoms or soles are trimmed, the trimming wheel or cutter makes a small contrasting stripe around the edge of each sole and gives it a striping effect so that no separate striping operation is necessary. Finally, the present method renders the rolling and waxing and polishing operations unnecessary and thereby avoids the production of the so-called "burnt" marks on the bottoms of the soles.

To facilitate an understanding of the present invention, reference is had to the accompanying drawing, in which:

Figure 1 is a plan view of a slab of rubber composition or like material, coated with enamel in accordance with the present invention, and from which a plurality of bottoms or soles may be cut.

Figure 2 is a section on line 2—2 of Figure 1.

Figure 3 is an elevational view showing a bottom or sole made in accordance with the present invention and attached to an upper as is done in carrying out the next to the last step of my improved method; and Figure 4 is a diagrammatic elevational view illustrating the last step of my improved method consisting in trimming the edge of the bottom or sole, subsequent to its attachment to the upper.

Referring more in detail to the drawing, 5 indicates a slab of rubber composition or similar material such as is commonly used in the production of so-called rubber shoe bottoms or soles, a plurality of such bottoms or soles being suitably cut from each slab of material in any desired or well known manner, as indicated at 5a. In accordance with the present invention, the bottoms or soles 5a are coated with an enamel prior to attachment or stitching of the same to its upper 6, such enamel having certain characteristics as will be presently made apparent. As shown, this enamel coating may be applied as at 7 to the slab 5 prior to cutting the bottoms or soles 5a therefrom. However, the enamel may be applied to the soles or bottoms 5a after they are cut from the slab 5, the essential fact being that such application of enamel to the bottoms or soles is prior to attachment or stitching of the bottoms or soles to the uppers. Application of the enamel to the slab or soles may be accomplished by a brush, spraying, dipping or the like. In order to be practical for use in coating the bottoms or soles prior to attachment or stitching of the latter to the uppers, the enamel must be non-absorbent and water-proof and of such a character that it will dry to a hard finish and will possess a material degree of flexibility when dried. It is also quite desirable that the enamel will dry quickly and provide a hard, smooth and luster surface when dry. I use such an enamel composed of a shellac varnish, with pigment to give the desired color and coverage, and a suitable plasticizer to impart a pronounced adhering quality and flexibility to the enamel.

The enamel coated bottoms or soles are attached to the uppers by the usual shoe-building and stitching machinery, after which the edge of the bottom or sole of each shoe is trimmed in a well known manner by an edge trimmer 8 as indicated in Figure 4. When this is done, the building of the shoe is completed, and a shoe is produced of uniform high quality in which there are no "burnt" high spots on the bottom or sole, in which the stitches or threads used for attachment of the bottom or sole to the upper are clean and unspotted with paint, and likewise with respect to the upper. Only four operations are required, namely, cutting the bottoms or soles, applying the enamel coating to the soles or to the slabs from which the soles are cut, attaching the enamel coated soles or bottoms to the uppers, and finally trimming the edges of the bottoms or soles after attachment of the same to the uppers. In this way, the shoes may be economically and expeditiously produced so as to be of uniform high quality and of fine appearance. No delay is experienced in waiting for slow-drying paint to dry after application to the bottoms or soles, even in damp weather and drying equipment is unnecessary. In addition, the necessity for a finishing department is entirely eliminated, it being unnecessary to wash, paint, roll and wax, and then polish the bottoms or soles after attachment to the uppers, or to clean the uppers after the bottoms or soles are attached thereto and before packing. In addition, the final operation of trimming the edges of black or dark bottoms or soles renders a separate striping operation unnecessary, and due to coating of the bottoms or soles before being stitched to the uppers, the stitching is unspotted with paint or enamel and shows in its natural color without cleaning. As the enamel dries with a luster, no polishing is necessary, and any lightly adhering dirt, dressing or cement may be readily removed from the bottoms or soles by the use of a damp cloth without harm to the enamel or its luster.

My contribution to the art is not believed to reside in the enamel per se, nor in the broad idea of merely making use of such an enamel instead of an ordinary water paint. It is a fact, however, that my invention will result in revolutionizing the art of producing rubber bottomed or rubber soled footwear by immeasurably advancing that art both as to speed and cost of production, as well as making possible the uniform production of a superior product. My contribution to the art is believed to particularly reside in suggesting and showing that it is practical and of benefit to coat the bottoms or soles before attachment to the uppers, and in disclosing the character of enamel necessary to make the same practical, as well as disclosing the advantages and benefits to be derived therefrom over prior methods in common use. It is to be understood that the term "rubber", as used herein, is to be construed to include equivalent material, such as rubber composition, etc. It will also be seen that my step of coating the slabs with the enamel takes the place of three steps heretofore required consisting in painting, waxing and polishing.

What I claim as new is:

1. The herein described improved method of producing rubber bottomed footwear, which consists in making a rubber shoe bottom coated with a non-absorbent and water-proof enamel which dries quickly to a hard finish and which possesses flexibility when dried, stitching the enamel coated bottom to an upper, and finally trimming the edge of the bottom subsequent to its attachment to the upper.

2. The herein described method of producing rubber bottomed shoes which consists in coating a rubber bottom with a non-absorbent and water-proof enamel having flexibility when dried, attaching the bottom to an upper subsequent to coating the same with the enamel, and finally trimming the edge of the bottom subsequent to its attachment to the upper.

3. The herein described method of producing rubber bottomed shoes which consists in producing a slab of rubber bottom material, coating said slab with a water-proof enamel possessing flexibility when dried, cutting shoe bottoms from said slab, attaching the bottoms to uppers subsequent to coating thereof, and finally trimming the edges of the bottoms after attachment of the same to the uppers.

FRANCIS PETER SCHAFFER.